United States Patent Office 2,814,446
Patented Nov. 26, 1957

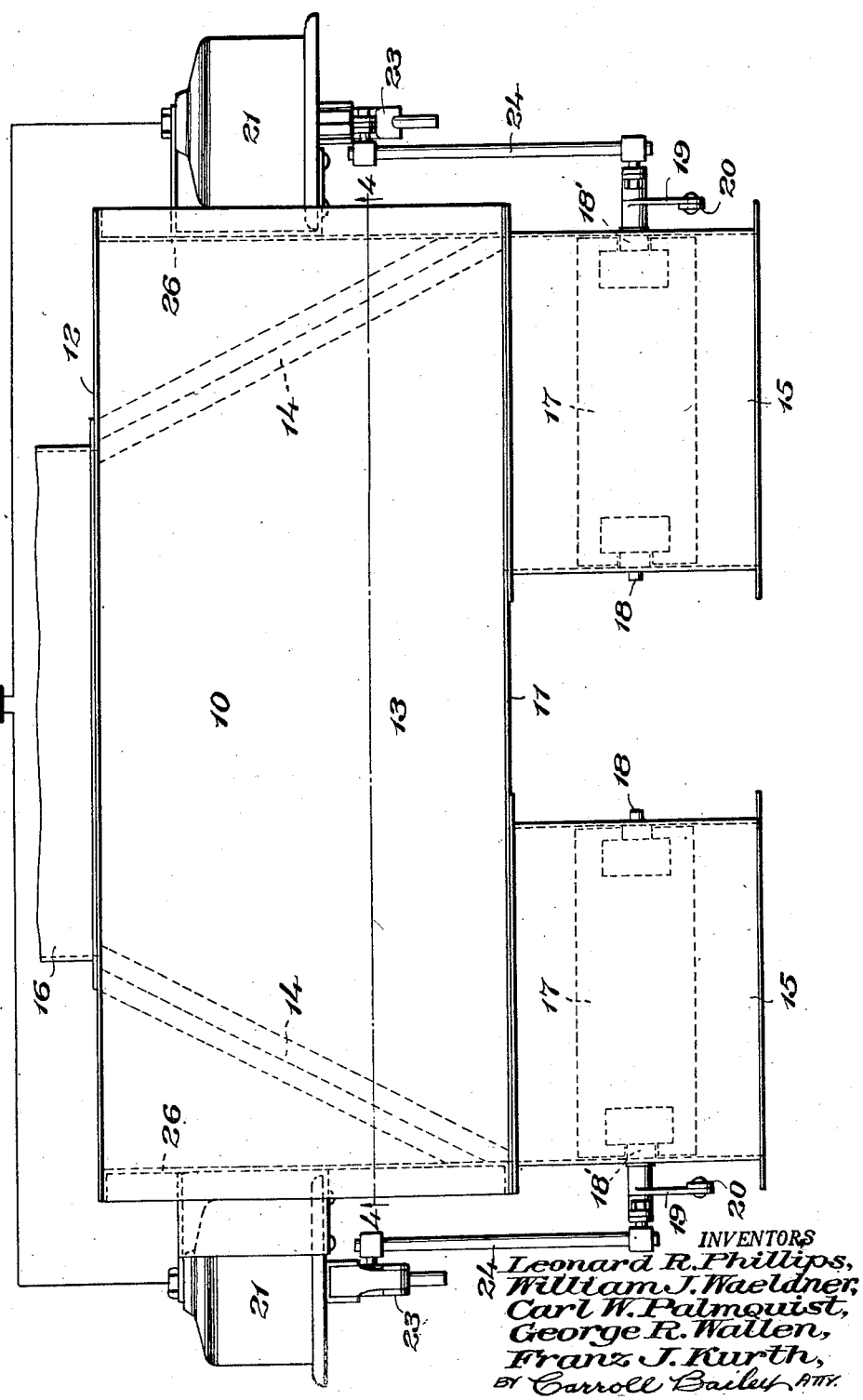

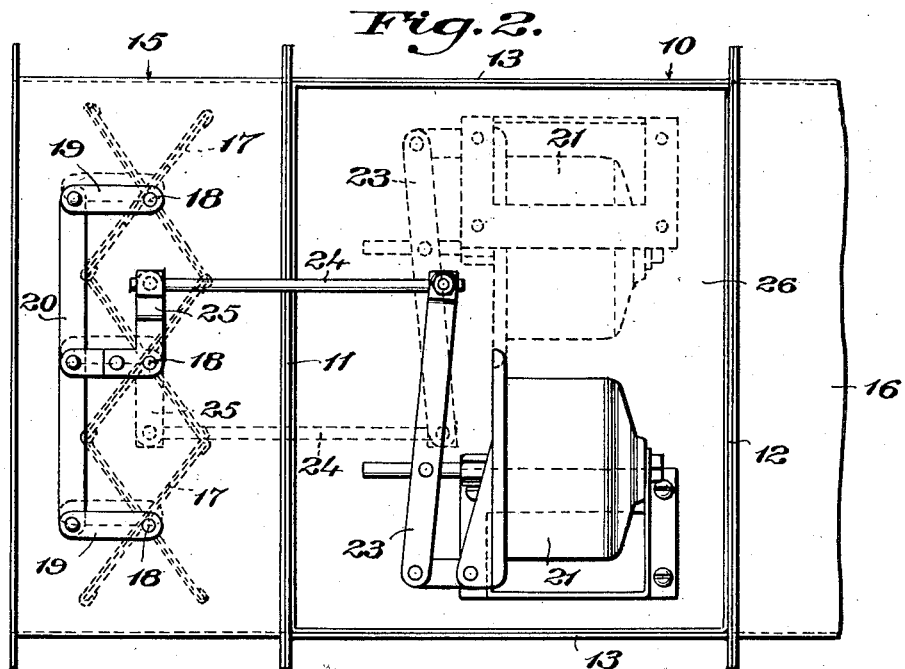
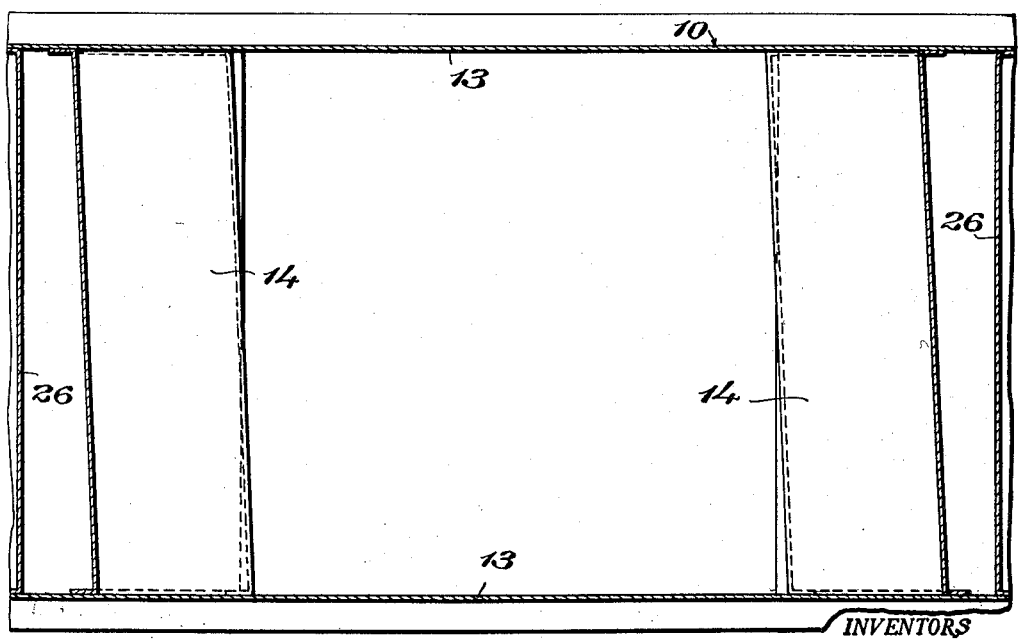

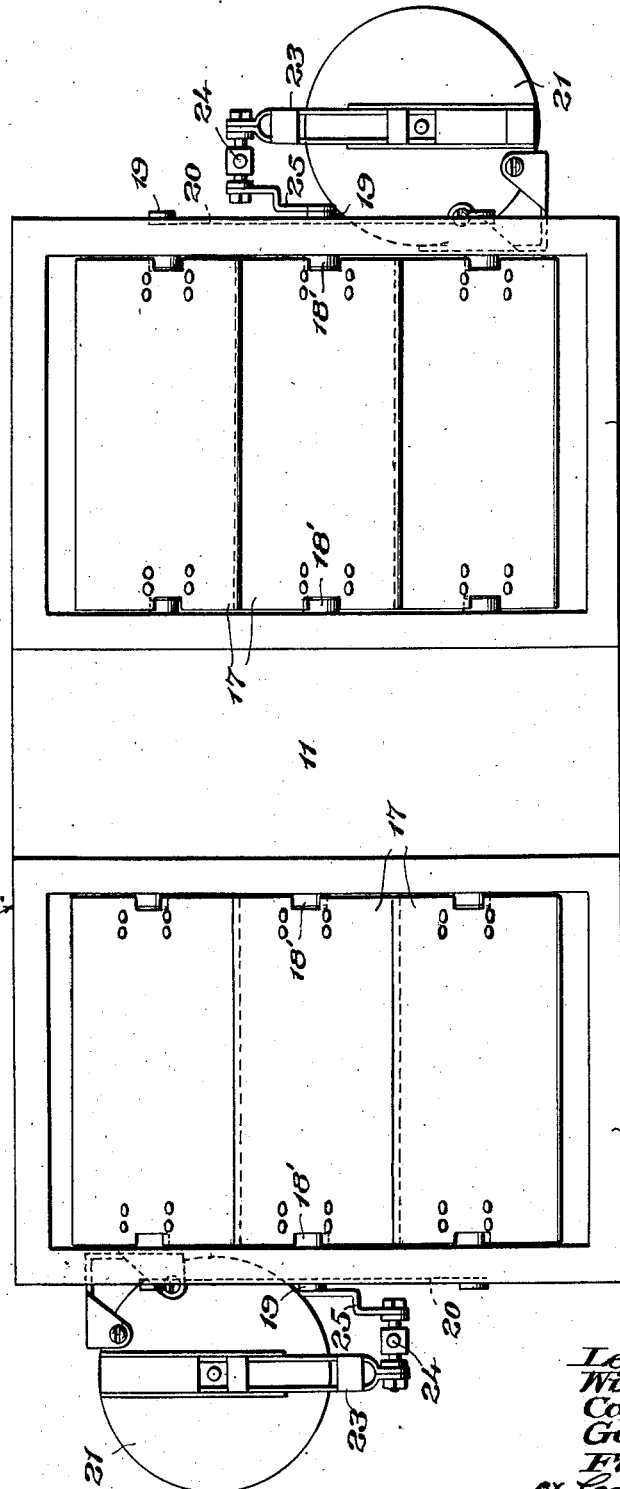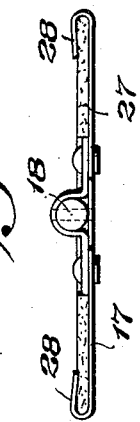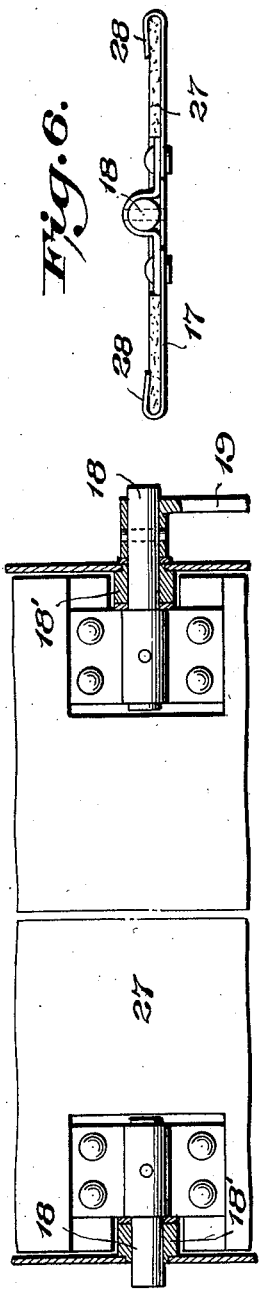
INVENTORS
Leonard R. Phillips,
William J. Waeldner,
Carl W. Palmquist,
George R. Wallen,
Franz J. Kurth,
BY Carroll Bailey ATT.

2,814,446

THERMALLY CONTROLLED MIXING APPARATUS

Leonard R. Phillips, East Hartford, William J. Waeldner, Farmington, and Carl W. Palmquist, Hartford, Conn., and George R. Wallen, Croton-on-Hudson, and Franz J. Kurth, Mamaroneck, N. Y., assignors to Anemostat Corporation of America, New York, N. Y., a corporation of Delaware Application July 25, 1955, Serial No. 524,082

3 Claims. (Cl. 236—13)

This invention relates to ventilating apparatus, and has particular reference to improvements in devices for regulating the relative amounts of, and for mixing, air of different temperatures for delivery into rooms or other enclosures at a desired modulated temperature.

According to the invention, a pair of ducts for supply of air at different temperatures are disposed in side to side relationship to each other and are connected to an air mixing chamber having an outlet for the mixed or modulated air. In each of the air supply ducts is a set of vanes which extend from side to side of the duct and which are tiltably adjustable to regulate the amount of supply air flowing through the duct to the mixing chamber. In this connection, one object of the invention is to utilize said vanes to promote effective mixing of the supply air in the mixing chamber. To that end, the two sets of vanes are disposed adjacent to the mixing chamber in planes extending transversely of the supply air ducts and means is provided which is operable in response to changes in temperature of the air in a room or other enclosure supplied with air by the device to tiltably adjust the vanes of both sets simultaneously in the same direction. The vanes of the two sets are angularly related to each other so that when the vanes of either set are closed the vanes of the other set are open. Therefore, in all intermediate positions of the vanes of the two sets the inclination of the vanes of one set is such as to deflect supply air from the related duct toward one side of the mixing chamber while the inclination of the vanes of the other set is such as to deflect air from the related duct toward the other side of the mixing chamber. As a consequence, the two supply air streams are caused to partake of spiral or cyclonic motions within the mixing chamber and thereby to become effectively intermixed.

Further, to the end of augmenting the action of the aforesaid vanes in promoting effective mixing of the two supply air streams in the mixing chamber, another object of the invention is to so incline the end walls of said chamber as not only to direct the air toward the outlet from said chamber, but also to cause the two supply air streams to partake of spiral or cyclonic motions within said chamber. The net result of the action of the vanes and of said inclined end walls is production of high turbulence and consequent exceptionally effective mixing of the two supply air streams in the mixing chamber so that in flowing from said chamber the mixed air is substantially uniformly of the same temperature.

With the foregoing and other objects in view, the invention consists in a device embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Fig. 1 is a top plan view of a device embodying the features of the invention.

Fig. 2 is an end view of the device.
Fig. 3 is a front view of the device.
Fig. 4 is a section on the line 4—4 of Fig. 1.
Fig. 5 is a detail sectional view showing the manner of tiltably mounting one of the vanes in one of the air supply ducts; and
Fig. 6 is an end view of one of the vanes.

Referring to the drawings in detail, 10 designates, generally, an air mixing chamber which may be of any suitable form, but which, preferably, is of rectangular shape in cross section, elongated, and composed of front and rear walls 11 and 12, respectively, side walls 13, 13 and end walls 14, 14.

Connected to the front wall 11 of the chamber 10 are two ducts 15, 15 for the supply of air of two different temperatures from any suitable sources to said chamber, while connected to the rear wall 12 of said chamber is a duct 16 through which air is conveyed from the chamber 10 to a room or other enclosure.

The ducts 15, 15 preferably are of rectangular shape in cross section and preferably are of the same height, or of approximately the same height, as the mixing chamber 10. Preferably, too, said ducts are also of equal, or approximately equal, widths and of less widths than heights. They are disposed in side to side relationship to each other and are suitably spaced apart longitudinally with respect to the mixing chamber, being connected to said chamber adjacent to its ends, respectively.

The air outlet duct 16 is alined approximately with the space between the ducts 15, 15. In addition, the mixing chamber end walls 14, 14 are inclined or converge rearwardly toward the sides of the outlet duct 16 so that air entering the mixing chamber from the ducts 15, 15 is directed toward said outlet duct 16.

In the ducts 15, 15 are sets of vanes 17, 17, respectively, which are rotatably or tiltably adjustable to regulate flow of air from said ducts into the mixing chamber 10. Both sets of said vanes are disposed closely adjacent to the mixing chamber 10 and preferably in a common plane extending at right angles to the ducts 15, 15. Moreover, the vanes of each set extend from side to side of their related duct and are of widths such that when they are rotated or tilted to positions at substantially right angles to their related duct they cooperate with each other to substantially completely deny any flow of air through said duct.

The vanes 17, 17 may be rotatably or tiltably mounted in the ducts 15, 15 in any suitable manner. As illustrated by way of example in the drawings, each vane has fixed thereto and extending beyond its ends, at points midway between its side edges, trunnions 18 which are journaled in bearing elements 19 carried by the side walls of the related air supply duct.

At one side of each duct 15 the trunnions 18 of the related set of vanes have fixed thereto arms 19 which are connected together by a rod 20. Thus, the vanes of each set are connected together for simultaneous or unitary tilting adjustments.

Suitable means, operable in response to changes in the temperature of the air in a room or other enclosure supplied with air by the device, is provided to tiltably adjust the two sets of vanes 17, 17. As illustrated by way of example in the drawings, this means may comprise a pair of pneumatic motors 21, 21 individual to the respective sets of vanes and controlled by a thermostat 22 disposed to be responsive to changes in the temperature of the air in a room or other enclosure supplied with air by the device. Said motors are of a known cylinder and piston type and need not be described in detail. Suffice it to say that each motor includes a pivoted lever 23 which is swung in one direction or the other depending upon whether the temperature in a room or other enclosure supplied with air by the device rises above or falls below a predetermined value as determined by the setting of the thermostat 22.

The motors 21, 21 may be mounted at the ends of the mixing chamber 10, as shown, and each motor may have its lever 23 connected by a rod 24 to an arm 25 fixed to one of the trunnions 18 of the related set of vanes. Thus, since the vanes of each set are connected together for unitary movements, swinging of the levers 23 of the motors will result in unitary tilting movements of the related vanes.

The motors 21, 21 will, of course, operate simultaneously and equally in varying amounts responsive to change in temperature and the degree of change in temperature of the air in a room or other enclosure supplied with air by the device. In this connection, in order to provide for rotation or tilting of the vanes of both sets in the same direction by said motors, the mounting of each motor and its connection with its related set of vanes is the reverse of the mounting of the other motor and of its connection with its related set of vanes (see Figs. 2 and 3).

Of course, a suitable mechanical connection might be provided between the two sets of vanes 17, 17 and in that event only a single motor might be employed to tilt both sets of vanes. In any event, the vanes of both sets are tilted simultaneously and equally in varying amounts in one direction or the other depending upon the rise or fall and the amount of rise or fall above or below a predetermined value of the temperature of the air in a room or other enclosure supplied with air by the device. In this connection, the relationship of the vanes of the respective sets to each other is such that when the vanes of either set are fully closed, the vanes of the other set are fully open. The vanes operate, of course, within a range not exceeding ninety degrees and preferably within a range of about seventy-five degrees. In any event, since the vanes 17, 17 are disposed adjacent to the mixing chamber 10, it follows that in all intermediate positions of the vanes of the two sets, the inclination of the vanes of one set is such as to deflect the air supplied through the related duct toward one side of the mixing chamber 10, while the inclination of the vanes of the other set is such as to deflect the air supplied through the related duct toward the other side of the mixing chamber. The result is that the two streams of air are caused to partake of spiral or cyclonic motions within the mixing chamber and thereby to become effectively intermixed.

To assist the vanes 17, 17 in promoting a mixing action of the two supply air streams in the mixing chamber 10, the end wall of said chamber, adjacent to the set of vanes which act to deflect the related supply air stream toward one side wall 13 of said chamber is inclined inwardly toward that side wall from the other side wall 13. Similarly, the other end wall of said chamber, which is adjacent to the set of vanes which act to deflect the related supply air stream toward the other side wall 13 of the chamber 10, is inclined inwardly toward said other side wall from the first mentioned side wall. Said end walls thus serve to deflect the supply air streams in opposite directions across the respective sides of the mixing chamber and to thereby promote spiral or cyclonic motions of said streams within the mixing chamber. The net result of the combined deflecting actions of the two sets of vanes and of the inclined end walls of the mixing chamber is production of high turbulence and consequent highly effective mixing of the two supply air streams in the mixing chamber so that in flowing from said chamber the mixed air is substantially uniformly of the same temperature.

For facility and economy in manufacture of the mixing chamber 10, said chamber preferably has its front, rear and side walls of equal lengths and preferably has, in addition to its true end walls 14, 14, stiffening end closures 26 which afford supports upon which to mount the motors 21, 21. However, said mixing chamber may be of rearwardly tapering shape as viewed in plan, in which event any rear wall may be unnecessary and may be eliminated, since the outlet duct 14 may be joined to the rear edges of the top, bottom and end walls.

In order to deaden any noise which might tend to be produced by flow of air against and over the vanes 17, 17, the rear sides of said vanes preferably are covered by a suitable sound deadening material 27, such as felt, which may be retained against the vanes by flanges 28 inturned over the same from the side edges of the vanes. This, however, is not essential.

Assuming that the two sets of vanes 17, 17 are approximately in half open positions when the air in the room or other enclosure supplied with air by the device is at a desired temperature corresponding to the setting of the thermostat 22, it will be apparent that decrease in the temperature of the room or enclosure air will cause the thermostat 23 to effect operation of the motors 21, 21 to simultaneously tilt the two sets of vanes 17, 17 to increase the supply of higher temperature air and to decrease the supply of lower temperature air to the mixing chamber 10. It will likewise be apparent that increase in the temperature of the room or enclosure air above its desired temperature will cause the thermostat 23 to effect operation of the motors 21, 21 to simultaneously tilt the two sets of vanes 17, 17 to increase the supply of lower temperature air and to decrease the supply of higher temperature air to the mixing chamber 10. Consequently, the temperature of the room or other enclosure air will be maintained at approximately the desired temperature as determined by the setting of the thermostat 22. Most importantly in this connection is the fact that the present device insures thorough mixing of the two supply air streams of different temperatures with each other before they are delivered into the room or other enclosure so that they enter the room or other enclosure at a uniform temperature.

From the foregoing description considered in connection with the accompanying drawings, it is believed that the construction and mode of operation of the present device will be clearly understood and that its advantages will be appreciated. It is desired to point out, however, that while only a single structural embodiment of said device has been illustrated and described, the same is readily capable of specifically different structural embodiments within the spirit and scope of the invention as defined in the appended claims.

We claim:

1. A device for regulating flow of and for mixing two different streams of air of different temperatures, said device comprising an elongated mixing chamber having front, side and end walls, a pair of ducts disposed in side to side relationship to each other and connected to said front wall adjacent to the ends of said chamber, respectively, for supplying to said chamber two different streams of air of different temperatures, said chamber having a rear outlet for connection with a room or other enclosure to be supplied with air by the device, said outlet being alined approximately with a point midway between said ducts, the end walls of said chamber converging rearwardly toward said outlet, a set of pivoted tiltable vanes in and extending from side to side of each of said ducts, each set of said vanes being disposed adjacent to said chamber in a plane at substantially right angles to the related duct, the two sets of vanes being substantially alined endwise with each other, and means operable in response to changes in temperature of the air in the room or other enclosure to simultaneously tilt both sets of said vanes in the same direction, the vanes of the respective sets being angularly related to each other so that when the vanes of one set are closed the vanes of the other set are open and so that in all intermediate positions of the vanes of the respective sets the vanes of one set are inclined to deflect air from their related duct toward one side of said mixing chamber and the vanes of the other set are inclined to deflect air from their related duct toward the other side of said mixing chamber, thereby to cause the two streams of air to become effectively mixed in said mixing chamber.

2. A device as set forth in claim 1 in which the end wall of the mixing chamber adjacent to the set of vanes which deflect air from the related duct toward one side wall of said chamber is inclined inwardly toward said side wall from the other side wall, and in which the other end wall of said chamber is inclined inwardly toward said second mentioned side wall from said first mentioned side wall.

3. A device for regulating flow of and for mixing two different streams of air of different temperatures, said device comprising an elongated mixing chamber having front, side and end walls, a pair of ducts disposed in side to side relationship to each other and connected to said front wall adjacent to the ends of said chamber, respectively, for supplying to said chamber two different streams of air of different temperatures, said chamber having a rear outlet for connection with a room or other enclosure to be supplied with air by the device, said outlet being alined approximately with a point midway between said ducts, a set of pivoted tiltable vanes in and extending from side to side of each of said ducts, each set of said vanes being disposed adjacent to said chamber in a plane at substantially right angles to the related duct, the two sets of vanes being substantially alined endwise with each other, and means operable in response to changes in temperature of the air in the room or other enclosure to simultaneously tilt both sets of said vanes in the same direction, the vanes of the respective sets being angularly related to each other so that when the vanes of one set are closed the vanes of the other set are open and so that in all intermediate positions of the vanes of the respective sets the vanes of one set are inclined to deflect air from their related duct toward one side of said mixing chamber and the vanes of the other set are inclined to deflect air from their related duct toward the other side of said mixing chamber, the end wall of the mixing chamber adjacent to the set of vanes which deflect air from the related duct toward one side wall of said chamber being inclined inwardly toward said side wall from the other side wall, and the other end wall of said chamber being inclined inwardly toward said second mentioned side wall from said first mentioned side wall, thereby to cause the two streams of air to become effectively mixed in said mixing chamber.

References Cited in the file of this patent

UNITED STATES PATENTS

| 1,015,204 | Murray | Jan. 16, 1912 |
| 1,075,197 | Cramer et al. | Oct. 7, 1913 |
| 2,705,595 | Carlson et al. | Apr. 5, 1955 |